United States Patent [19]

Martin

[11] Patent Number: 4,959,899
[45] Date of Patent: Oct. 2, 1990

[54] TUBE PULLING DEVICE

[75] Inventor: Paul W. Martin, Springfield, Ohio

[73] Assignee: Dresser Industries, Inc., Dallas, Tex.

[21] Appl. No.: 427,731

[22] Filed: Oct. 27, 1989

[51] Int. Cl.$^5$ .................... B23P 19/04; B23P 15/26
[52] U.S. Cl. ...................................... 29/726; 29/252; 29/282
[58] Field of Search .............. 29/252, 282, 726, 727, 29/157.4, 926.5; 254/93 R; 269/98.1, 3, 6

[56] References Cited

U.S. PATENT DOCUMENTS

| | | |
|---|---|---|
| 3,367,011 | 2/1968 | Sipher . |
| 3,369,287 | 2/1968 | Brochetti . |
| 3,791,011 | 2/1974 | Keys . |
| 3,835,520 | 9/1974 | Sismore . |
| 4,077,102 | 3/1978 | Smith . |
| 4,280,274 | 7/1981 | Filer . |
| 4,283,826 | 8/1981 | Miller . |
| 4,369,569 | 1/1983 | Armstrong et al. .................. 29/252 |
| 4,679,315 | 7/1987 | Overbay ................................ 29/252 |
| 4,829,648 | 5/1989 | Arzenti et al. ....................... 29/252 |

Primary Examiner—Robert C. Watson
Attorney, Agent, or Firm—Ross, Howison, Clapp & Korn

[57] ABSTRACT

A tube pulling device for extracting a tube from a tube sheet includes a cylindrical housing having an operating chamber with an opening at the forward end thereof and the rear end of the operating chamber being closed. A front piston is reciprocally disposed in the operating chamber and provided with an axial passage therethrough. A tubular extension is slidably disposed in the operating chamber opening and is connected to the front piston. The tubular extension includes a plurality of spaced jaws for engaging the bore of the tube to be extracted. A rear piston is provided and reciprocally disposed in the operating chamber. The rear piston includes a piston rod disposed within the axial passage of the front piston and extends for slidable movement in the operating chamber opening. An expansion device is interconnected to the piston rod and extends through the tubular extension of the front piston. The front piston includes a fluid passageway communicating with the rear piston and a source of fluid for supplying fluid to the rear piston. A control device is disposed in the fluid passageway for controlling flow of fluid from the supply source to the rear piston. An actuating device is disposed in the rear piston for engagement with the control device for terminating the flow of fluid through the fluid passageway to the rear piston when the force acting on the rear piston reaches a predetermined magnitude thereby preventing further expansion of the plurality of spaced jaws.

20 Claims, 3 Drawing Sheets

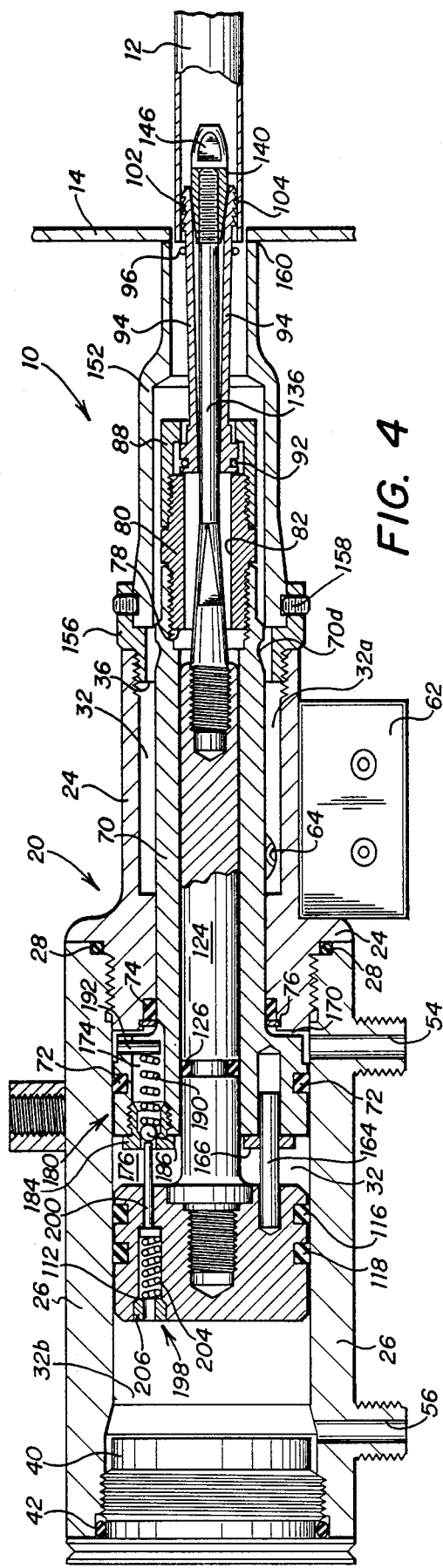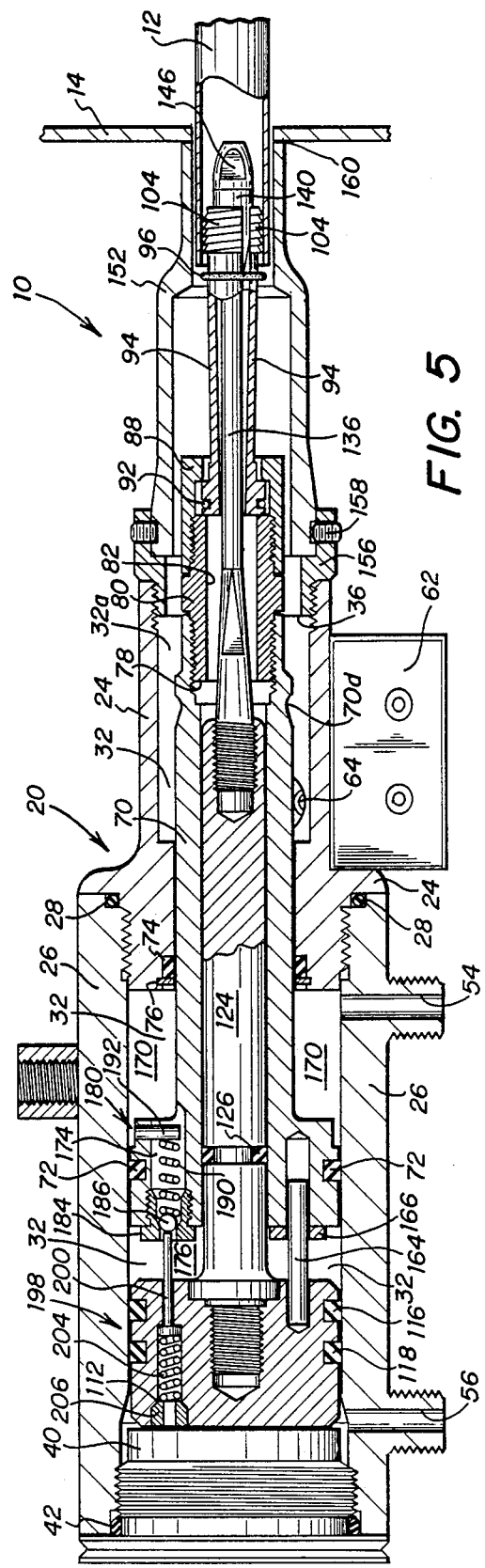

TUBE PULLING DEVICE

TECHNICAL FIELD OF THE INVENTION

The present invention relates to industrial tools, and more particularly, to an improved device for pulling tubes from tube sheets in heat exchangers, condensers, and the like.

BACKGROUND OF THE INVENTION

Heat exchangers are often comprised of a multiplicity of heat exchange tubes which extend between and are generally supported by at least one tube sheet or plate. The tube sheet has a series of holes cut therein, the tubes are inserted into the holes in the tube sheet, and then the tubes are expanded in the area of the tube sheet so that pressure contact exists between the tubes and the tube sheet.

In the course of normal maintenance or due to malfunctions, it is necessary to replace one or more of the tubes used in a given heat exchange unit. The replacement of a tube requires that the heat exchange unit be removed from the particular cycle in which it is normally employed. Depending upon the installation, the removal of the heat exchanger from operation may result in either inefficient operation or total stoppage of the cycle. Therefore, removal and/or replacement of the tubes must be accomplished as expeditiously as possible.

Previously developed tube pulling devices have utilized a radially expandable jaw, and a plurality of teeth extending annularly about and radially outward from the jaw. An expansion device having a rearwardly tapered wedge longitudinally extends through the radially expandable jaw, and the jaw is expanded by pulling the expansion device towards the back of the tube puller. This relative movement brings a tapered portion of the wedge into contact with the inside of the jaw, and further rearward movement of the wedge forces the teeth of the jaw radially outwardly into the inner surface of the tube to be extracted. Once the teeth securely grip the tube, the jaw is pulled toward the back of the extracting tool, pulling the tube from the tube sheet. The movement in the same direction towards the back of the extracting mechanism, is used to both expand the jaw and pull the tube from the tube sheet.

The previously developed tube pulling devices have not been entirely satisfactory. The jaws may frequently break. Additionally, during the extraction process, while the teeth securely grip the inside wall of the tube and the jaw and teeth are pulled away from the tube sheet to pull the tube therefrom, portions of the tube sidewall are pushed radially inward by the teeth toward the center of the tube. This inward deformation of material decreases the inside diameter of the tube, and the deformed material may scrap or drag against or otherwise interfere with the teeth as the teeth and jaw are withdrawn from the tube. Furthermore, the engagement of the teeth with the tube may cause the tube to deform outwardly, making it more difficult to extract the tube from the tube sheet.

A need has thus arisen for a tube pulling device that operates reliably for the extraction of various sized diameter tubes from a tube sheet. A need has further arisen for a tube pulling device which will automatically control the amount of force exerted by the jaw against the tube during the extraction process.

SUMMARY OF THE INVENTION

In accordance with the present invention, a tube pulling device for extracting a tube from a tube sheet or the like includes a cylindrical housing having an operating chamber with an opening at the forward end thereof and the rear end of the operating chamber being closed. A front piston is reciprocally disposed in the operating chamber and is provided with an axial passage therethrough. A tubular extension is slidably disposed in the operating chamber opening and is connected to the front piston. The tubular extension includes a plurality of spaced jaws for engaging the bore of the tube to be extracted. A rear piston is provided and is reciprocally disposed in the operating chamber. The rear piston includes a piston rod disposed within the axial passage of the front piston and extends for slidable movement in the operating chamber opening. An expansion device is interconnected to the piston rod and extends through the tubular extension of the front piston for spreading and contracting the plurality of spaced jaws upon rearward and forward movement of the rear piston. The front piston includes a fluid passageway communicating with the rear piston and a source of fluid for supplying fluid to the rear piston to thereby generate a force acting on the rear piston to move the rear piston in the operating chamber away from the opening, thereby moving the expansion device into engagement with the plurality of spaced jaws. A control device is disposed in the fluid passageway for controlling the flow of fluid from the supply source to the rear piston. An actuating device is disposed in the rear piston for engagement with the control device for terminating the flow of fluid through the fluid passageway to the rear piston when the force acting on the rear piston reaches a predetermined magnitude thereby preventing further expansion of the plurality of spaced jaws. The fluid supplied by the fluid source then generates a force acting on the front piston such that the front piston and the rear piston move rearwardly within the operating chamber away from the opening, thereby retracting the tubular extension into the operating chamber to extract the tube from the tube sheet without further expansion of the plurality of spaced jaws.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIGS. 2 through 5 are longitudinal sectional views of the tube pulling device shown in FIG. 1 illustrating the present tube pulling device in various stages of operation.

DETAILED DESCRIPTION OF THE PREFERRED EMBODIMENTS

Figure 1:
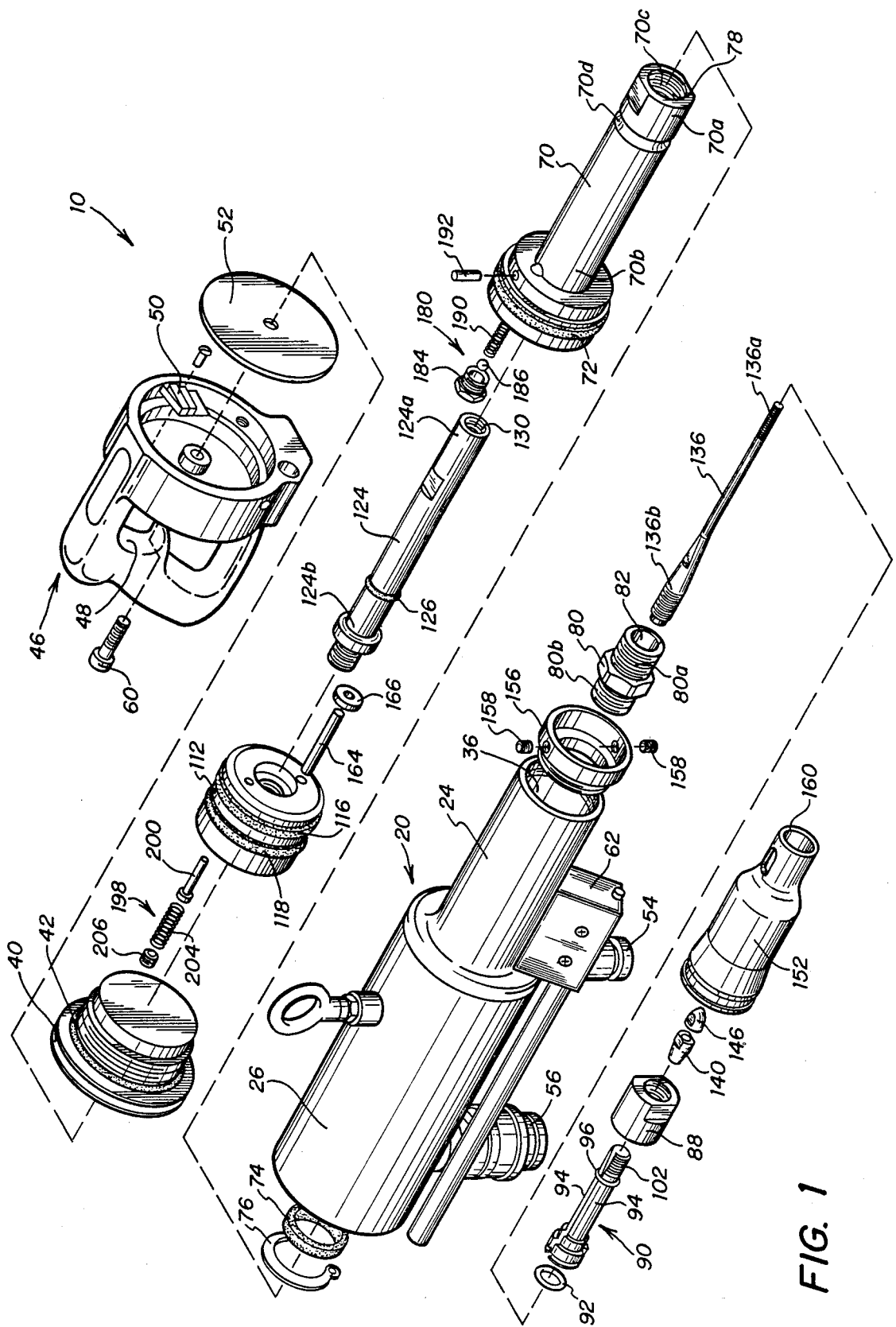
FIG. 1 is an exploded perspective view of the present tube pulling device.
Figure 2:
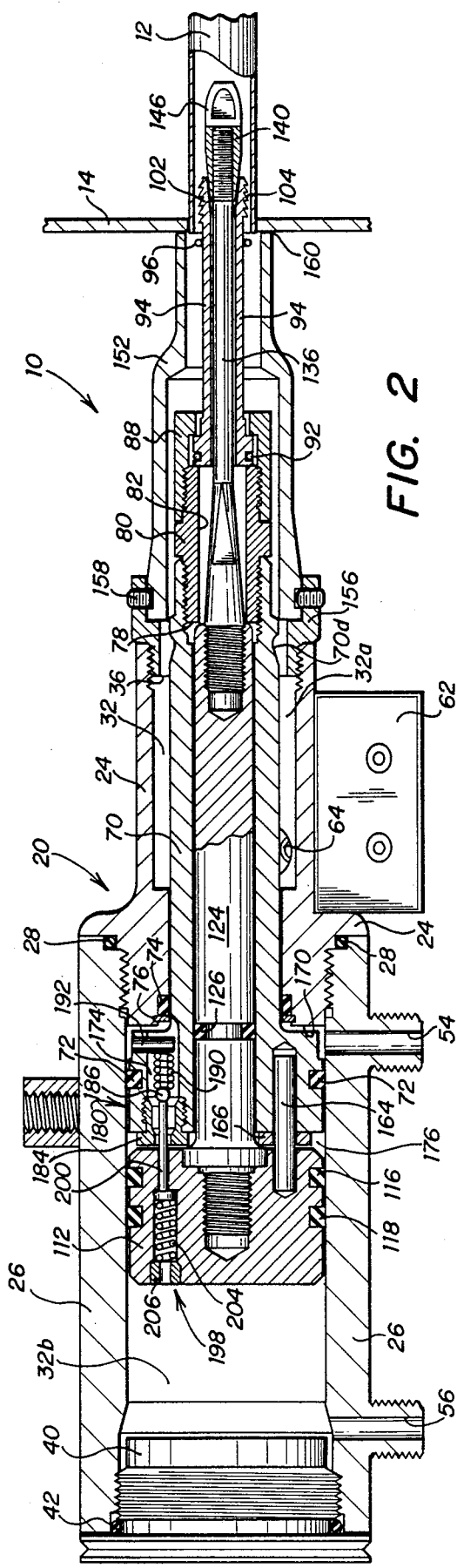

Referring simultaneously to FIGS. 1 and 2, the present tube pulling device is illustrated, and is generally identified by the numeral 10. Tube pulling device 10 may be utilized, for example, for extracting a tube 12 from a tube sheet 14 of similar plate in a heat exchanger, condenser or the like. Tube pulling device 10 includes a cylindrical case assembly, generally identified by the numeral 20. Cylindrical case assembly 20 includes a front portion 24 and a rear portion 26 which are threadedly engaged. An O-ring 28 is disposed between front portion 24 and rear portion 26 of cylindrical case assembly 20.

Cylindrical case assembly 20 defines an operating chamber 32 having a front end 32a and a rear end 32b. Front end 32a of operating chamber 32 includes an opening 36 whereas rear end 32b of operating chamber 32 is closed by a cylinder plug 40. Cylinder plug 40 is sealed to rear portion 26 of cylindrical case assembly 20 utilizing an O-ring 42.

Interconnected to cylindrical case assembly 20 at the rear end 32b, is a handle mechanism generally identified by the numeral 46. Handle mechanism 46 includes a trigger 48 for activating tube pulling device 10. Trigger 48 actuates a trigger switch 50 which in turn controls the supply of fluid, such as for example, hydraulic fluid from a fluid source to operating chamber 32. A switch insulator 52 is disposed between handle mechanism 46 and cylinder plug 40. Cylindrical case assembly 20 includes a front port 54 and a rear port 56. Fluid from the fluid supply source (not shown) flows into and out of operating chamber 32 through both ports 54 and 56. Handle mechanism 46 is interconnected to cylinder plug 40 using a bolt 60.

Cylindrical case assembly 20 further includes a microswitch 62 having a contact roller 64 which is disposed within operating chamber 32. The function of rear microswitch 62 will subsequently be described.

Disposed within operating chamber 32 toward the front end 32a thereof, is a front piston 70. Front piston 70 has a front end 70a and a rear end 70b and is mounted for reciprocal movement within operating chamber 32. Front piston 70 includes an axial passage 70c disposed therethrough and a circumferentially disposed groove 70d. Front piston 70 includes a piston seal 72 for engaging rear portion 26 of cylindrical case assembly 20. A cylindrical seal 74 and snap ring 76 are disposed between front piston 70 and front portion 24 of cylindrical case assembly 20.

End 70a of front piston 70 includes a threaded aperture 78 for receiving an adapter 80. Adapter 80 includes threaded portions 80a and 80b. Threaded portion 80b of adapter 80 mates with threaded aperture 78 of front piston 70. Adapter 80 includes a centrally disposed bore 82. Interconnected to threaded portion 80a of adapter 80 is a gripper retainer 88 for retaining a gripper or tubular extension 90. An O-ring 92 is disposed around tubular extension 90 and within retainer 88. Tubular extension 90 consists of three gripper segments 94 which are held together by gripper retainer 88 at the rear end thereof and an O-ring 98 at the forward end thereof.

Gripper segments 94 include a plurality of spaced apart jaws 102 including a plurality of threads 104. Threads 104 extend helically around tubular extension 90, and during operation of the present tube pulling device, engage the bore surface of tube 12. It therefore can be seen that tubular extension 90, composed of gripper segments 94, is connected to form an integral structure with front piston 70, such that movement of front piston 70 within operating chamber 32 causes a corresponding movement of tubular extension 90. For example, as front piston 70 moves toward rear end 32b of operating chamber 32, tubular extension 90 moves rearwardly. Similarly, as front piston 70 moves toward front end 32a of operating chamber 30, tubular extension 90 moves outwardly from opening 36 of operating chamber 32.

Further disposed within operating chamber 32 is a rear piston 112, generally disposed within the rear portion 32b of operating chamber 32. Rear piston 112 includes piston seals 116 and 118 which engage rear portion 26 of operating chamber 32. Threadedly interconnected to rear piston 112 is a piston rod 124 having a front end 124a and rear end 124b and is disposed within axial passage 70c of front piston 70. A piston rod seal 126 is disposed on piston rod 124 and engages front piston 70. Rear piston 112 is reciprocally disposed within rear portion 26 for slidable movement in the forward and rearward directions within operating chamber 32.

Piston rod 124, front end 124a extends to opening 36 of operating chamber 32 and includes a threaded aperture 130 for receiving a draw rod 136. Draw rod 136 extends through bore 82 of adapter 80 and into tubular extension 90 between gripper segments 94. Threadedly interconnected to draw rod 136 is an expansion nut 140 which, when drawn into tubular extension 90 causes jaws 102 to expand to thereby engage tube 12. Threadably interconnected to draw rod 136 is a lock nut 146. It therefore can be seen that forward and rearward movement of rear piston 112 within operating chamber 32 of cylindrical case assembly 20 causes draw rod 136 to move forwardly and rearwardly of opening 36 of operating chamber 32. The rearward movement of rear piston 112 causes draw rod 136 to be retracted within operating chamber 132 to thereby expand gripper segments 94 and cause gripper segments 94 to engage tube 12. Similarly, the forward movement of rear piston 112 causes draw rod 136 to move forwardly thereby disengaging expansion nut 140 from gripper segments 94, such that gripper segments 94 disengage from tube 12.

Disposed around tubular extension 90, gripper retainer 88 and adapter 80 is a bushing 152. Bushing 152 is interconnected to cylindrical case assembly 20 utilizing an adapter 156 which threadedly engages end 32a of operating chamber 30. Bushing 152 is secured to adapter 156 utilizing set screws 158. Bushing 152 includes an end surface 160 which is disposed on tube sheet 14 around tube 12 during the extraction of tube 12 from tube sheet 14.

Front piston 70 and rear piston 112 are maintained in alignment utilizing a pin 164. Disposed around pin 164 and between front piston 70 and rear piston 112 is a spacer 166.

Disposed around front piston 70 and in fluid communication with front port 54 is a fluid passageway 170. Fluid passage 170 communicates with a fluid passageway 174 disposed within rear portion 70b of front piston 70. Fluid passageway 174 communicates with a fluid passageway 176 disposed between front piston 70 and rear piston 112.

An important aspect of the present invention is the use of a control device generally identified by the numeral 180 disposed within fluid passageway 174 of front piston 70. Control device 180 controls the flow of fluid from the supply source to the rear piston 112 and fluid passageway 176. Control device 180 includes a valve seat 184 through which a valve ball 186 moves to open or close control device 180. Valve ball 186 is normally biased by a valve spring 190 to seat. Spring 190 is held in place by a pin 192. As illustrated in FIG. 2, valve ball 186 is in the open position such that fluid flows from front port 54 through fluid passageway 170, fluid passageway 174, and fluid passageway 176 to rear piston 112.

Control device 180 is activated through the use of an actuating device generally identified by the numeral 198. Actuating device 198 is disposed within rear piston 112 and includes a plunger 200 which passes through fluid passageway 174 and valve seat 184 to engage valve ball 186. Plunger 200 is biased through the use of a spring 204 to maintain control device 180 open. The spring force exerted by spring 204 on plunger 200 is adjustable through the use of a set screw 206.

Figure 3:
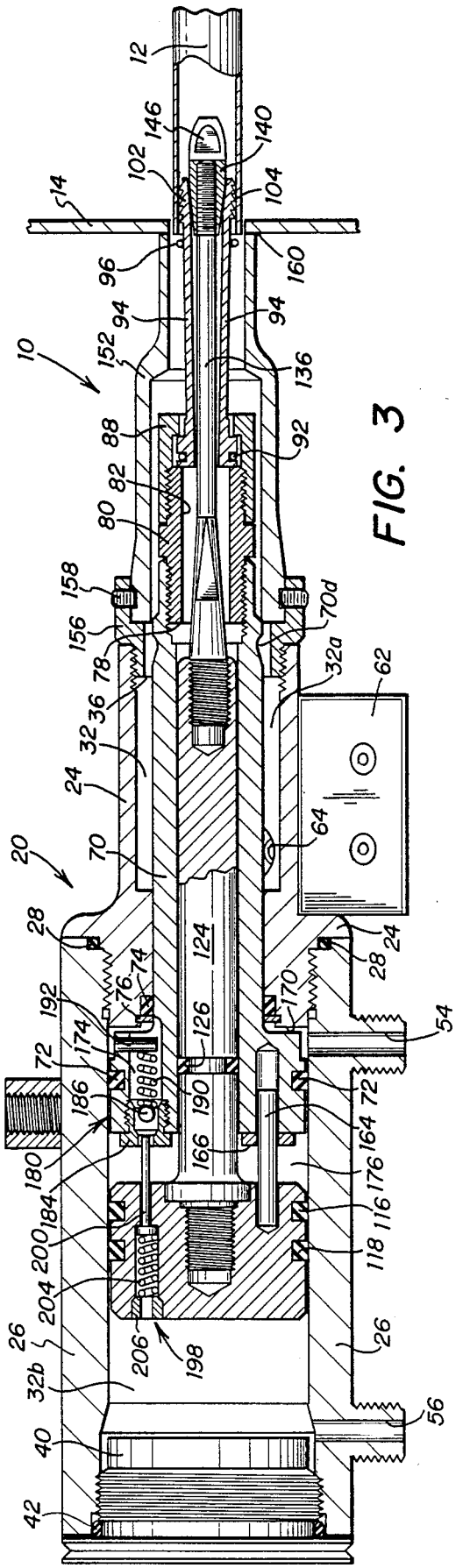

Referring simultaneously to FIGS. 2-5, the operation of the present tube pulling device 10 will now be discussed. FIG. 2 illustrates the position of front piston 70 and rear piston 112 in a reset position prior to actuation of trigger 48 (FIG. 1). Upon actuation of trigger 48, trigger switch 50 energizes a pump and allows fluid to be pumped from the fluid source into the front port 54 of operating chamber 32. Fluid then flows through fluid passageways 170 and 174 through control device 180 into fluid passageway 176. Because of the differential area of front piston 70 and rear piston 112, rear piston 112 moves toward the rear of operating chamber 32 before movement of front piston 70 begins. Control device 180 is maintained in the open position due to the operation of plunger 200 holding valve ball 186 off of valve seat 184. As rear piston 112 moves rearwardly within operating chamber 32, draw rod 136 retracts to thereby move expansion nut 140 between gripper segments 94 such that jaws 102 engage the interior of tube 12. The position of rear piston 112 as jaws 102 engage tube 12 is illustrated in FIG. 3. Valve ball 186 has moved interiorly into passageway 174, but has not completely sealed control device 180, and fluid continues to flow through fluid passageway 174 into passageway 176.

Once jaws 102 have embedded within tube 12, further movement of draw rod 136 and rear piston 112 is impeded. Pressure continues to build between front piston 70 and rear piston 112 until this pressure overcomes the bias force spring 204, such that plunger 200 retracts within actuating device 198 which allows valve ball 186 to seat within valve seat 184 as illustrated in FIG. 4. With valve ball 186 seated within valve seat 184, the flow of fluid to rear piston 112 stops and fluid pressure continues to build on front piston 70 since fluid can no longer pass to fluid passageway 176 between front piston 70 and rear piston 112. As the pressure continues to build on front piston 70, front piston 70 and rear piston 112 move rearwardly as a unit pulling both tubular extension 90 and draw rod 136 rearwardly in order to extract tube 12 from tube sheet 14. Tube 12 is pulled by gripper segments 94 and not draw rod 136. No further expansion of gripper segments 94 occurs since there is no further independent rearward motion of rear piston 112 with respect to front piston 70. Because control device 180 has closed, no additional force is experienced by draw rod 136 regardless of the force required to pull tube 12 from tube sheet 14.

FIG. 5 illustrates the position of front piston 70 and rear piston 112 once gripper segments 94 have been fully retracted within cylindrical case assembly 20 such that tube 12 has been extracted from tube plate 14. Trigger 48 is then released, and the flow of fluid is reversed such that fluid flows into rear port 56 and out of front port 54 until front piston 70 and rear piston 112 are returned to the positions as illustrated in FIG. 2. A pressure switch (not shown) located at the source of fluid senses a buildup of pressure once the position of front piston 70 and rear piston 112 has been achieved as illustrated in FIG. 2, and fluid flow is terminated.

If during the pulling cycle, tube 12 is not extracted from tube sheet 14, microswitch roller 64 of microswitch 62 will engage groove 70d of front piston 70, activating microswitch 62 in order to limit the stroke of pistons 70 and 112. Upon actuation of microswitch 62, fluid flow to operating chamber 32 is reversed such that front piston 70 and rear piston 112 move to the forward position as illustrated in FIG. 2 regardless of whether trigger 48 is actuated. When front piston 70 and rear piston 112 are in their forwardmost position, expansion nut 140 is moved away from gripper segments 94 so that gripper segments 94 can collapse away from tube 12. Tube 12 can then be removed from tube sheet 14 or if tube 12 has not been pulled free of tube sheet 14, tube pulling device 10 can be reinserted into tube 12 for a second extraction operation. Tube 12 can be removed from gripper segments 94 by "unscrewing" tube 12 since the engagement of threads 104 with tube 12 has formed a helical thread within tube 12 so that tube 12 can be turned off from gripper segments 94 as if tube 12 were threaded.

It therefore can be seen that the amount of pressure that can build against rear piston 112 and therefore the amount of pressure used to expand gripper segments 94 is controlled by control device 180 and the spring tension of spring 204. Once the pressure on rear piston 112 reaches a predetermined amount, valve spring 190 overcomes the force exerted by spring 204, such that valve ball 186 seats within valve seat 184 to stop the flow of fluid to rear piston 112. Rear piston 112 therefore can no longer move independently of front piston 70 stopping any further expansion of gripper segments 94 and thereby limiting the pressure of gripper segments 94 on tube 12 as tube 12 is extracted from tube sheet 14. Therefore, even if tube 12 requires the entire pressure developed by tube pulling device 10, draw rod 136 is not further stressed while tube 12 is being extracted. Control device 180 and actuating device 198 operating in combination therefore permit the independent motion of rear piston 112 with respect to front piston 70 for expansion of gripper segments 94 and provides for the simultaneous motion of front piston 70 and rear piston 112 for the extraction of tube 12 from tube plate 14.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A tube pulling device for extracting a tube from a tube sheet or the like comprising:

a cylindrical housing having an operating chamber with an opening at the forward end thereof and the rear end of said operating chamber being closed;

a front piston reciprocally disposed in said operating chamber and provided with an axial passage therethrough;

a tubular extension slidably disposed in said operating chamber opening and connected to said front piston;

said tubular extension including a plurality of spaced jaws for engaging the bore of the tube;

a rear piston reciprocally disposed in said operating chamber and having a piston rod disposed within said axial passage of said front piston extending for slidable movement in said operating chamber opening, said piston rod having first and second ends, said first end being connected to said rear piston;

expansion means interconnected to said second end of said piston rod and extending through said tubular extension of said front piston for spreading and contracting said plurality of spaced jaws upon rearward and forward movement of said rear piston;

said front piston including a fluid passageway communicating with said rear piston and a source of fluid for supplying fluid to said rear piston to thereby generate a force acting on said rear piston to move said rear piston in said operating chamber away from said opening thereby moving said expansion means into engagement with said plurality of spaced jaws;

control means disposed in said fluid passageway for controlling the flow of fluid from the supply source to said rear piston and for generating a variable force in response to forces acting on said rear piston;

actuating means disposed in said rear piston for engagement with said control means and responsive to changes in pressure generated by said variable force generated by said control means for terminating the flow of fluid through said fluid passageway to said rear piston when the force acting on said rear piston reaches a predetermined magnitude, thereby preventing further expansion of said plurality of spaced jaws and thereby causing the fluid from the fluid source to generate a force acting on said front piston; and said force acting on said front piston thereby moving said front piston and said rear piston within the operating chamber away from said opening, thereby retracting said tubular extension into said operating chamber to extract the tube from the tube sheet without further expansion of said plurality of spaced jaws.

2. The tube pulling device of claim 1 wherein said control means includes:
a valve for allowing fluid to flow within said fluid passageway when said valve is open and for preventing fluid to flow within said fluid passageway when said valve is closed.

3. The tube pulling device of claim 1 wherein said actuating means includes a plunger for engaging said control means and a spring for biasing said plunger against said control means.

4. The tube pulling device of claim 1 wherein said control means includes a valve for allowing fluid to flow within said fluid passageway when said valve is open and for preventing fluid to flow within said fluid passageway when said valve is closed; and
said actuating means includes a plunger for engaging said valve and a plunger spring for normally biasing said plunger against said valve, thereby maintaining said valve open, said force acting on said rear piston compressing said plunger spring thereby allowing said valve to close.

5. The tube pulling device of claim 4 wherein said valve includes:
a ball, a valve seat, and a valve spring, said valve spring being compressed by said plunger to maintain said ball spaced apart from said valve seat to thereby open said valve, and said valve spring biasing said ball in said valve seat to close said valve when said plunger spring is compressed.

6. The tube pulling device of claim 1 wherein said plurality of spaced apart jaws include exterior teeth circumferentially disposed around said tubular extension.

7. The tube pulling device of claim 6 wherein said teeth are disposed helically around said tubular extension.

8. The tube pulling device of claim 1 and further including:
means for sensing the position of said front piston for terminating the flow of fluid from the supply source to said front piston.

9. The tube pulling device of claim 1 and further including:
means for supplying fluid from the supply source to said rear piston for moving said rear piston and said front piston toward said forward end of said operating chamber after extracting a tube from the tube sheet.

10. A tube pulling device for extracting a tube from a tube sheet or the like comprising:
a cylindrical housing having an operating chamber with an opening at the forward end thereof and the rear end of said operating chamber being closed;
a front piston reciprocally disposed in said operating chamber and provided with an axial passage therethrough;
a tubular extension slidably disposed in said operating chamber opening and connected to said front piston;
said tubular extension including a plurality of spaced jaws for engaging the bore of the tube;
a rear piston reciprocally disposed in said operating chamber and having a piston rod disposed within said axial passage of said front piston extending for slidable movement in said operating chamber opening, said piston rod having first and second ends, said first end being connected to said rear piston;
expansion means interconnected to said second end of said piston rod and extending through said tubular extension of said front piston for spreading and contracting said plurality of spaced jaws upon rearward and forward movement of said rear piston;
said front piston including a fluid passageway communicating with said rear piston and a source of fluid for supplying fluid to said rear piston to thereby generate a force acting on said rear piston to move said rear piston in said operating chamber away from said opening thereby moving said expansion means into engagement with said plurality of spaced jaws;
control means disposed in said fluid passageway for controlling the flow of fluid from the supply source to said rear piston;
actuating means disposed in said rear piston for engagement with said control means for terminating the flow of fluid through said fluid passageway to said rear piston when the force acting on said rear piston reaches a predetermined magnitude, thereby preventing further expansion of said plurality of spaced jaws and thereby causing the fluid from the fluid source to generate a force acting on said front piston;
said actuating means includes a plunger for engaging said control means and a spring for biasing said plunger against said control means; and said force acting on said front piston thereby moving said front piston and said rear piston within the operating chamber away from said opening, thereby retracting said tubular extension into said operating chamber to extract the tube from the tube sheet without further expansion of said plurality of spaced jaws.

11. The tube pulling device of claim 10 wherein said control means includes:
   a valve for allowing fluid to flow within said fluid passageway when said valve is open and for preventing fluid to flow within said fluid passageway when said valve is closed.

12. The tube pulling device of claim 10 wherein said plurality of spaced apart jaws include exterior teeth circumferentially disposed around said tubular extension.

13. The tube pulling device of claim 12 wherein said teeth are disposed helically around said tubular extension.

14. The tube pulling device of claim 10 and further including:
   means for sensing the position of said front piston for terminating the flow of fluid from the supply source to said front piston.

15. The tube pulling device of claim 10 and further including:
   means for supplying fluid from the supply source to said rear piston for moving said rear piston and said front piston toward said forward end of said operating chamber after extracting a tube from the tube sheet.

16. A tube pulling device for extracting a tube from a tube sheet or the like comprising:
   a cylindrical housing having an operating chamber with an opening at the forward end thereof and the rear end of said operating chamber being closed;
   a front piston reciprocally disposed in said operating chamber and provided with an axial passage therethrough;
   a tubular extension slidably disposed in said operating chamber opening and connected to said front piston;
   said tubular extension including a plurality of spaced jaws for engaging the bore of the tube;
   a rear piston reciprocally disposed in said operating chamber and having a piston rod disposed within said axial passage of said front piston extending for slidable movement in said operating chamber opening, said piston rod having first and second ends, said first end being connected to said rear piston;
   expansion means interconnected to said second end of said piston rod and extending through said tubular extension of said front piston for spreading and contracting said plurality of spaced jaws upon rearward and forward movement of said rear piston;
   said front piston including a fluid passageway communicating with said rear piston and a source of fluid for supplying fluid to said rear piston to thereby generate a force acting on said rear piston to move said rear piston in said operating chamber away from said opening thereby moving said expansion means into engagement with said plurality of spaced jaws;
   control means disposed in said fluid passageway for controlling the flow of fluid from the supply source to said rear piston;
   said control means includes a valve for allowing fluid to flow within said fluid passageway when said valve is open and for preventing fluid to flow within said fluid passageway when said valve is closed;
   actuating means disposed in said rear piston for engagement with said control means for terminating the flow of fluid through said fluid passageway to said rear piston when the force acting on said rear piston reaches a predetermined magnitude, thereby preventing further expansion of said plurality of spaced jaws and thereby causing the fluid from the fluid source to generate a force acting on said front piston;
   said actuating means includes a plunger for engaging said valve and a plunger spring for normally biasing said plunger against said valve, thereby maintaining said valve open, said force acting on said rear piston compressing said plunger spring thereby allowing said valve to close; and
   said force acting on said front piston thereby moving said front piston and said rear piston within the operating chamber away from said opening, thereby retracting said tubular extension into said operating chamber to extract the tube from the tube sheet without further expansion of said plurality of spaced jaws.

17. The tube pulling device of claim 16 wherein said valve includes:
   a ball, a valve seat, and a valve spring, said valve spring being compressed by said plunger to mantan said ball spaced apart from said valve seat to thereby open said valve, and said valve spring biasing said ball in said valve seat to close said valve when said plunger spring is compressed.

18. The tube pulling device of claim 17 wherein said plurality of spaced apart jaws include exterior teeth circumferentially disposed around said tubular extension.

19. The tube pulling device of claim 18 wherein said teeth are disposed helically around said tubular extension.

20. The tube pulling device of claim 17 and further including:
   means for sensing the position of said front piston for terminating the flow of fluid from the supply source to said front piston.

* * * * *